3,655,774
METHOD FOR PRODUCING LOW MOLECULAR WEIGHT THIOETHERS

Yves Labat, Pau, France, assignor to Societe Nationale des Petroles d'Aquitaine tour Aquitaine, Courbevoie, France
No Drawing. Filed Apr. 28, 1969, Ser. No. 819,943
Claims priority, application France, Apr. 30, 1968, 150,081, 150,082
Int. Cl. C07c *149/06, 149/10*
U.S. Cl. 260—609 A                    10 Claims

ABSTRACT OF THE DISCLOSURE

A method is described, which permits of easily and economically preparing mixtures of thioethers $$HS(CH_2S)_nH$$

substantially OH free having an enhanced content of methane-dithiol $HSCH_2SH$ and monothioether dithiol $HSCH_2SCH_2SH$; the average value of $n$ of the mixtures is about 1.2 to 2.6. The method consists in reacting monothioether diol $HOCH_2SCH_2OH$ or formaldehyde HCHO, or a mixture of these two compounds, preferably in aqueous solution, with at least 2.5 moles $H_2S$ per mole of the compound or compounds between 20° and 90° C.; the pH of the reaction medium is adjusted to a value comprised between 8 and a minimum which is a linear function of temperature, and is defined by the extreme limits: 6.8 at 20° C. and 3.3 at 90° C. The thioethers formed are then separated by conventional means from the reaction medium, after excess $H_2S$ has been degassed.

BACKGROUND OF THE INVENTION

The invention relates to the preparation of thioethers of low molecular weight, carrying two thiol functions. It is more particularly concerned with obtaining compounds of the $HS(CH_2S)_nH$ type, of which the coefficient $n$ is equal to 1 or 2, it being possible for these compounds to be admixed with one another and possibly with other thioethers having a different $n$ coefficient, but the proportion of the product $n=1$ and 2 being predominant.

The manufacture of the aforementioned compounds is well known at the present time, since these substances are useful in industry, particularly for the production of sulphur-containing resins, as described in French Pat. No. 1,394,209. The process most employed consists in causing liquid hydrogen sulphide to react with formaldehyde, as explained for example in U.S. Pat. No. 3,056,841. However, when carried out in accordance with the prior art, this reaction leads to polythioether dithiols (also referred to as mercapto-polythiomethylenes or polythioformaldehydes), but the molecules of these compounds contain a substantial proportion of undesirable OH groups. The aforementioned U.S. patent indicates a treatment with the aid of a non-oxidizing mineral acid, as means for causing the hydroxyls to disappear, but this treatment increases the cost and complicates the manufacturing operation; moreover, the results of such an acid treatment are not completely irreproachable. Processes exist which enable $HS(CH_2S)_nH$ compounds free from OH groups to be directly obtained, in accordance with French Pats. Nos. 1,362,500 and 1,465,475, but then the major part of the products as thus obtained has $n$ values greater than 2; actually, the first of these French patents is concerned with a very practical process for obtaining oligomers of which the average value of $n$ is from 2 to 8, and more particularly from 3 to 4, while the second patent is only concerned with the preparation of the compound in which $n=3$. $HS(CH_2S)_nH$ compounds free from OH groups can easily be obtained by the action of hydrogen sulphide on the monothioether diol $HOCH_2SCH_2OH$, in accordance with French Pat. No. 1,527,701. However, this process leads particularly to mixtures of thioethers, of which the coefficient $n$ has values from 2 to 5; the mixtures which are formed all contain at most about 25% of monothioether dithiol ($n=2$) and less than 2% of methane dithiol ($n=1$).

Thus, a truly economic and convenient industrial process for the manufacture of methane dithiol $HS-CH_2-SH$ and monothioether dithiol $HS-CH_2SCH_2SH$ (or bis-mercaptomethyl sulphide) that is to say, of the 2 first terms of series of the compounds $HS(CH_2S)_nH$, with respectively $n=1$ and 2, molecular weights of 80 and 126 and free from OH groups did not exist until the present time.

Contrary to the prior art, the present invention enables mixtures of thioethers, mainly formed of $HSCH_2SH$ and $HS(CH_2S)_2H$, not containing any or a very small amount of OH groups, to be produced economically. The invention results from the unexpected discovery that, under certain specific conditions, such mixtures with a very high content of thioethers with $n=1$ and $n=2$ (molecular weights 80 and 126), can be obtained from formaldehyde or from monothioether diol $HOCH_2SCH_2OH$, or both at the same time, by the action of hydrogen sulphide. In view of the fact that the monothioether diol can be prepared under certain conditions by reacting $H_2S$ with HCHO, the present invention provides new industrial possibilities as regards the production of the various aforementioned compounds. In actual fact, it becomes possible, within the limits of the same manufacturing process, to produce at will the monothioether diol and/or thiols with $n=1$ and $n=2$. Thus, in accordance with the invention, the possibility is provided of preparing these thiols directly from formaldehyde and $H_2S$, or even by subsequent transformation of all or part of the previously manufactured monothioether diol (monothioether glycol); if this diol and thiols are required at the same time, it is optionally possible, after producing the diol, to use a part of the reaction medium containing the diol, HCHO and $H_2S$, for the production of thiols. In all three cases, the thiols are obtained under the same specific conditions according to the present invention, and this provides the advantage of being able to employ an industrial unit with a single method of control, permitting the treatment of the three different types of starting materials.

DETAILED DESCRIPTION OF THE INVENTION

The new process according to the invention consists in causing at least 2.5 moles of $H_2S$ to react with 1 mole of HCHO, or 1 mole of $HOCH_2SCH_2OH$, or even with 1 mole of a mixture of $HCHO+HOCH_2SCH_2OH$, at a temperature from 20° to 90° C., the pH of the reaction medium being between 8 and a minimum, which is 6.8 for 20° C. and 3.3 for 90° C., and which assumes an intermediate value between 3.3 and 6.8, which is inversely proportional to the temperature for each of the temperatures between 20° and 90° C.

Although the invention can be carried into effect as soon as the proportion of $H_2S$ reaches 2.5 moles per mole of HCHO, it is preferable for the molar ratio of $H_2SHCHO$ to be, for example, 2.5 to 7 or more.

The aqueous solution of formaldehyde being used can titrate 10 to 80% by weight of HCHO, but the preferred concentrations are from 20 to 50%, comprising the strengths of 30 to 40% of the conventional commercial solutions.

The preferred temperatures within the range from 20° to 90° C. are from 55° to 85° C., and the necessary minimum pH values are respectively 5.0 and 3.5. The minimum pH value can be calculated for each temperature by applying the practical rule, according to which the pH value must be increased by 0.05 for each degree C. by which the temperature is lowered. Thus, for a temperature T ° C., which is between 20° and 90° C., the pH is given by the empirical formula: $3.3+0.05\times(90-T)$.

It may be noted that, in U.S. Pat. No. 3,056,841, the $H_2S/HCHO$ proportions (1.75 to 10), the temperatures (40°–150° C.) and the pH values (3.5–7) surround the special conditions of the present invention, but they lead to products containing OH groups, because the combination between the 3 factors is different from that according to the invention. Actually, in the examples given in the cited patent, with the temperature fixed at 60° C., a pH of 3.4 to 4.2 is used, whereas a pH of at least 4.8 is necessary at 60° C. in accordance with the conditions specified by the present invention. On the other hand, the U.S. patent indicates the $H_2S/HCHO$ ratios from 1.75 to 2 as being the best, and the most important examples, 1, 2 and 4, are based on these ratios, while the improvement according to the invention excludes the use of ratios below 2.5.

An important factor in carrying the process according to the invention into effect is the period of contact between the hydrogen sulphide in excess and the formaldehyde: this contact preiod can be extended until the desired results are obtained, that is to say, generally for 3 to 18 hours and usually 4 to 15 hours. The longest contact periods correspond to the lowest temperatures.

As regards the use of monothioether diol, theoretically the action of the hydrogen sulphide on the monothioether glycol should have taken place in accordance with the equation

$$HO(CH_2S)CH_2OH+2H_2S \rightarrow HS(CH_2S)_2H+2H_2O$$

but in actual fact, the earlier works mentioned above have shown that, when starting with a 6.1% aqueous solution of monothioether glycol, only a small amount of monothioether dithiol ($n=2$) is formed, and the average values of $n$ vary according to the temperature:

$n=$about 2.63 at 50° C.
$n=$about 2.9 at 60° C.
$n=$about 3.5 at 70° C.
$n=$about 3.85 at 80° C.
$n=$about 3.95 at 85° C.

Consequently, it is quite surprising that when the present invention is used, average values of $n$ of the order of 1.2 to 2.6 are obtained, and if desired these are very close to 2. The new process does in fact make it possible to obtain at will mixtures which can contain more than 60% of methane dithiol or more than 60% of monothioether dithiol, and generally mixtures in having a content of thioether in which $n$ is more than 2, is smaller than 60%, and can even be reduced to a very small proportion, lower than 5%.

As with formaldehyde, the preferred temperatures extend from 55° to 85° C. and the corresponding minmum pH values are respectively 5 and 3.5. The minimum pH can be calculated for each temperature by using the practical rule, according to which the pH value has to be increased by 0.05 for each ° C. by which the temperature is lowered. Thus, for a temperature T ° C., which is between 20 and 90° C., the pH must be at least $$3.3+0.05(90-T) \quad \text{(empirical/formula)}$$

In the following description, the monothioether diol, i.e. the monothioether glycol $HO-CH_2SCH_2-OH$, is designated by the abbreviation "diol."

Although the invention can be carried into effect as soon as the proportion of $H_2S$ reaches 2.5 moles per mole of diol, it is preferable for the molar ratio between $H_2S$ and diol to be at least 2.7, for example 2.7 to 7 or more.

In view of the large proportions of $H_2S$ which are necessary, the operation if generally carried out under pressure; depending on the temperature, the proportion of hydrogen sulphide and the proportion of liquid, particularly water, in the reaction medium, the pressure varies within wide limits, but it is usually of the order of 20 to 60 atmospheres; in general, the operation takes place under the autogenous pressure of the liquid $H_2S$ at the given temperature.

The diol can be used as such, in solution in an appropriate solvent or in a solution of formaldehyde; it is obviously the aqueous solution which is the most economical; on the other hand, it permits the reaction to be terminated in the best possible way. Generally speaking, the concentration of diol in the solution can vary between 5 and 100%, preferably from 30 to 70%.

The diol which is used according to the invention can originate from any one of its known methods of preparation, and particularly from the preparation as indicated above, which consists in causing $H_2S$ to react with a formaldehyde solution; it may be advantageous to use the medium resulting from this preparation, in order to add to it the excess of $H_2S$ required according to the invention, and to place it under the conditions indicated above, with a view to the transformation into thioethers. It is also possible to use the mixtures of monothioether diol with monothioether dithiol, which result from certain industrial operations.

One important factor for carrying out the present invention is the length of the contact period between hydrogen sulphide in excess and the monothioether diol: this contact period has to be prolonged, until the desired results are obtained, i.e. generally for 3 to 18 hours and usually 4 to 9 hours.

The invention is illustrated by the following non-limiting examples.

Examples 1–7.—Preparation from formaldehyde

The operations take place in a stainless steel 5-litre autoclave equipped with a thermometer, a pressure gauge, a pipe for the introduction of liquid $H_2S$, a device through which the gas which has not reacted can be evacuated on completing the operation, a magnetic agitator and an electric heating jacket.

On starting each operation, 1000 g. of 36% commercial formaldehyde solution (12 moles), brought to the required pH value by adding a small quantity of aqueous sodium hydroxide, are introduced into the autoclave. The autoclave is hermetically sealed, and the predetermined quantity of liquid $H_2S$, i.e. 750 g. (22 moles) to 2040 g. (60 moles), depending on the circumstances, is injected thereinto. The autoclave is then heated at the selected temperature for 8 hours. The pressure is initially of the order of 35 to 60 atm. and is progressively lowered during the reaction towards 25 atm. The contents of the autoclave are stirred throughout the operation.

On completion, when the pressure does not fall any lower, the excess hydrogen sulphide is degasified, after having cooled the autoclave to ambient temperature. $H_2S$, dissolved in the remaining water, is driven off by a stream of nitrogen.

The liquid organic phase, which has formed, is separated by decantation from the aqueous phase; it is dried, weighed and analysed in known manner. By vacuum distillation, there is established the content by weight of $HS-CH_2S-H$, $HS-CH_2-SCH_2-SH$ and compounds with more than 2 $CH_2S$ groups. As regards the proportion of combined OH groups, it is measured by a spectrometer (bands of 2.775 and 9.9 microns) and expressed as a percentage by weight of $-CH_2OH$.

The results are set out in the following Table I.

TABLE I

| Example Number | 1 | 2 | 3 | 4 | 5 | 6 | 7 |
|---|---|---|---|---|---|---|---|
| Molar ratio, $H_2S/HCHO$ | 2.2 | 3 | 5 | 5 | 3 | 5 | 2.1 |
| Temperature, °C | 55 | 55 | 55 | 85 | 75 | 85 | 85 |
| pH | 5.7 | 5.7 | 3.5 | 5.7 | 8.7 | 3.5 | 3.5 |
| Product obtained, percent: | | | | | | | |
| N (average) | 2.6 | 1.87 | 1.39 | 2 | 2.35 | 1.65 | 2.8 |
| $CH_2OH$ | 0.84 | 0 | 0.49 | 0 | 0 | 0 | 0.38 |
| $HS-CH_2-SH$ | 5 | 10 | 46 | 11 | 4 | 31 | 7 |
| $HS-(CH_2S)_2-H$ | 45 | 64 | 40 | 55 | 49 | 49 | 40 |
| $HS-(CH_2S)_nH$ of $n>2$ | 50 | 26 | 14 | 35 | 47 | 20 | 53 |
| Molar yield, percent, based on formaldehyde: | | | | | | | |
| $HS-CH_2-SH$ | 4 | 8.5 | 41 | 7 | 3 | 27 | 6 |
| $HS-(CH_2S)_2-H$ | 46 | 67 | 45 | 55 | 49 | 55 | 39 |

Examples 8–17.—Preparation from monothioether diol

The operations are carried out in the same apparatus as used for Examples 1 to 7.

At the start of each operation, 1000 g. of a cold, aqueous solution with 47% by weight of monothioether diol, i.e. 5 moles of this compound (dihydroxymethyl sulphide) are introduced; this solution is brought to the required pH value by adding a little aqueous sodium hydroxide. The autoclave is hermetically closed and there is injected thereinto the predetermined quantity of liquid $H_2S$, i.e. 440 g. (13 moles) to 850 g. (25 moles), depending on circumstances, using a proportioning pump. The autoclave is then heated at the chosen temperature for 8 hours. The pressure varies from a value in the region of 35 atm. to 25 atm., during the reaction, while the contents of the autoclave are stirred.

On conclusion, when the pressure does not fall any further, the excess hydrogen sulphide is degasified, after having cooled the autoclave to ambient temperature. Dissolved $H_2S$ in the remaining water is driven off with a stream of nitrogen.

The liquid organic phase which has formed is separated by decantation from the aqueous phase; it is dried, weighed and analysed in known manner. By vacuum distillation, the content by weight of $HS-CH_2-H$, of $$HS-CH_2SCH_2-SH$$

and of compounds containing more than 2 $CH_2S$ groups is established. As regards the proportion of the combined OH groups, this is measured by a spectrometer (bands of 2.775 and 9.9 microns) and expressed as a percentage by weight of $-CH_2OH$. The results are set out in the following Table II.

Example 18

Under the general conditions of Examples 8 to 17, there is used a molar ratio of $H_2S$/diol=5, at 85° C. and with an initial pH of 5.7, for 8 hours. Instead of an aqueous solution, pure thioether diol is used. Under these conditions, the average $n$ value is 1.76 and the $-CH_2OH$ content is 0.23%. The product obtained has the composition:

25% of $HSCH_2SH$: yield 19%
55% of $HS(CH_2S)_2H$: yield 53%
20% of $HS(CH_2S)_nH$: $n>2$ Example 19

Under the general conditions of Examples 8 to 17, a 23% by weight solution of monothioether diol in an 18% by weight aqueous solution of formaldehyde is treated with $H_2S$ at 55° C., the pH of the solution being adjusted to 5.7. The proportion of $H_2S$ is 3.7 moles per 0.5 mole of diol and 0.5 mole of HCHO, i.e. 3.7 moles per 1 mole of diol plus formaldehyde mixture. These are substantially the conditions of Example 14.

The product obtained contains 41% of HS $CH_2SH$, 47% of $HS(CH_2S)_2H$ and 12% of thioethers with $n$ higher than 2, while no OH groups are found in the product.

These results show that the invention makes it possible to obtain products with a high content of methane dithiol and particularly of monothioether dithiols; the content of this latter reaches 40 to 64%, according to the working conditions, while it is generally much lower in the mixtures of polythioether dithiols prepared according to the prior art.

Another important fact is that, by a suitable adjustment at the same time of the $H_2S$/HCHO or $H_2S$/diol ratios and of the pH, it becomes possible to avoid completely the formation of hydroxylated compounds.

TABLE II.—EXAMPLES 8 TO 17

| Example No. | 8 | 9 | 10 | 11 | 12 | 13 | 14 | 15 | 16 | 17 |
|---|---|---|---|---|---|---|---|---|---|---|
| Molar ratio, $H_2S$/diol | 2.6 | 3.5 | 5 | 5 | 2.6 | 3.5 | 3.5 | 5 | 5 | 3 |
| Temperature, °C | 85 | 85 | 85 | 85 | 55 | 55 | 55 | 55 | 55 | 55 |
| pH | 5.7 | 5.7 | 5.7 | 3.5 | 5.7 | 3.5 | 5.7 | 5.7 | 3.5 | 5.7 |
| Product obtained, percent: | | | | | | | | | | |
| N (average) | 2.87 | 2.61 | 1.85 | 1.65 | 1.91 | 1.70 | 1.51 | 1.26 | 1.46 | 1.75 |
| $-CH_2OH$ | 0 | 0 | 0 | 0 | 0.7 | 1.84 | 0 | 0 | 0.13 | 0 |
| $HS-CH_2-SH$ | 1 | 2 | 13 | 20 | 12 | 24 | 40 | 62 | 42 | 25 |
| $HS-(CH_2S)_2-H$ | 24 | 42 | 63 | 50 | 61 | 54 | 47 | 32 | 44 | 58 |
| $HS-(CH_2S)_nH$ of $n>2$ | 75 | 56 | 24 | 30 | 27 | 22 | 13 | 6 | 14 | 17 |
| Molar yields, percent, based on diol: | | | | | | | | | | |
| $HS-CH_2-SH$ | 0.7 | 1.5 | 10.5 | 17 | 8 | 20 | 34 | 58 | 36 | 21 |
| $HS-(CH_2S)_2-H$ | 23 | 41 | 64 | 48 | 60 | 53 | 51 | 38 | 48 | 55 |

Examples 1 to 7 actually prove that, despite a correct pH, the product obtained contains $-CH_3OH$ groups, if the said ratio is close to 2 (respectively 2.2 and 2.1). These groups appear in Example 3, because the pH is too low (3.5) for a temperature of 55° C., although the $H_2S$/HCHO molar ratio is suitable (5).

The agreement between the acceptable minimum pH and the temperature is clearly shown in Examples 3 and 6: while pH 3.5 is too low for 55° C., since it leads to the presence of hydroxyls, it is quite suitable at 85° C. This completely confirms the rule concerning the pH and the temperature which has been set out above.

Moreover, whereas a product not containing any OH group is still obtained at 85° for a pH of 3.5 (Example 11), the content of $CH_2OH$ reaches 1.84% for a $H_2S$/diol ratio of 3.5 (Example 13) with this same pH value at 55°, and this content is still 0.13% for a ratio of 5 at the same pH of 3.5 (Example 16). On the other hand, Example 18 shows that the content of $CH_2OH$ groups increases when the reaction medium does not contain water as solvent.

It is of interest to note that it is possible to increase or reduce at will the proportion of methane dithiol $HS-CH_2-SH$ by a judicious choice of the pH value and of the $H_2S$ excess; the examples show that this proportion can be easily modified from 4 (Example 5) to 46% (Example 3). For a like $H_2S$/HCHO ratio and a like temperature, the content of methane dithiol can be increased by using a pH as close as possible to the permitted minimum, and conversely (Examples 4 and 6). In order to increase the content of $HS-CH_2-SH$ in the product, at a given pH value and temperature, it is advisable to adjust the $H_2S$/HCHO or $H_2S$/diol ratio to the highest possible value.

Example 19 shows that good results are obtained with a mixture of formaldehyde and monothioether diol.

I claim:

1. Process for the production of mixtures of thioethers which consists in that at least 2.5 moles of $H_2S$ are reacted with a mole of a material selected from the group consisting of formaldehyde, monothioether diol and mixtures of formaldehyde with monothioether diol, at a temperature from 20° to 90° C., the pH of the reaction medium being between 8 and a minimum, which is 6.8 for 20° C. and 3.3 for 90° C., and then separating the thioethers formed from the reaction medium consisting essentially of the formula $HS(CH_2S)_nH$, having an enhanced content in thioethers with $n$ equal to 1 and 2 and substantially OH free.

2. Process according to claim 1, wherein the proportion of $H_2S$ is from 2.5 to 7 moles per mole of said material.

3. Process according to claim 1, wherein the said material is in the form of a 5% to 100% by weight aqueous solution, and preferably 30 to 70% by weight.

4. Process according to claim 2, wherein the said material is in the form of a 5% to 100% by weight aqueous solution, and preferably 30 to 70% by weight.

5. Process according to claim 4, in which the minimum pH at each centigrade temperature $T°$ is equal to $3.3+0.05\times(90-T)$.

6. Process according to claim 1, characterized in that the reaction lasts from 3 to 18 hours.

7. Process for the production of mixtures of thioethers showing the constitution $HS(CH_2S)_nH$ with average $n$ value comprised between 1.2 to 2.6, which consists in contacting at least 2.5 moles of hydrogen sulfide with 1 mole of monothioether diol $HO-CH_2S-CH_2OH$, at a temperature of 20° to 90° C., the pH of the mixture of the reagents being adjusted to a value comprised between 8 and a minimum which is equal to $3.3+0.05(90-T)$, where $T$ is the number of degrees of the centigrade temperature, during 3 to 18 hours, and then separating the thioethers formed from the reaction medium.

8. Process for the production of mixtures of thioethers showing the constitution $HS(CH_2S)_nH$ with average $n$ value comprised between 1.2 to 2.6, which consists in contacting at least 2.5 moles of hydrogen sulfide with 1 mole of formaldehyde, at a temperature of 20° to 90° C., the pH of the mixture of the reagents being adjusted to a value comprised between 8 and a minimum which is equal to $3.3+0.05(90-T)$, where $T$ is the number of degrees of the centigrade temperature, during 3 to 18 hours, and then separating the thioethers formed from the reaction medium.

9. Process according to claim 7, wherein 2.5 to 7 moles of hydrogen sulfide are contacted with 1 mole of the monothioether, the temperature being of 55° to 85° C. and the duration of the contact 9 to 4 hours.

10. Process according to claim 8, wherein 2.5 to 7 moles of hydrogen sulfide are contacted with 1 mole of the formaldehyde, the temperature being of 55° to 85° C., and the duration of the contact 15 to 4 hours.

References Cited

UNITED STATES PATENTS 3,056,841    11/1962    Saegebarth _____ 260—609

FOREIGN PATENTS 1,330,819    1963    France _____ 260—609
1,362,500    1964    France _____ 260—609

JOSEPH REBOLD, Primary Examiner

D. R. PHILLIPS, Assistant Examiner